Patented Apr. 26, 1927.

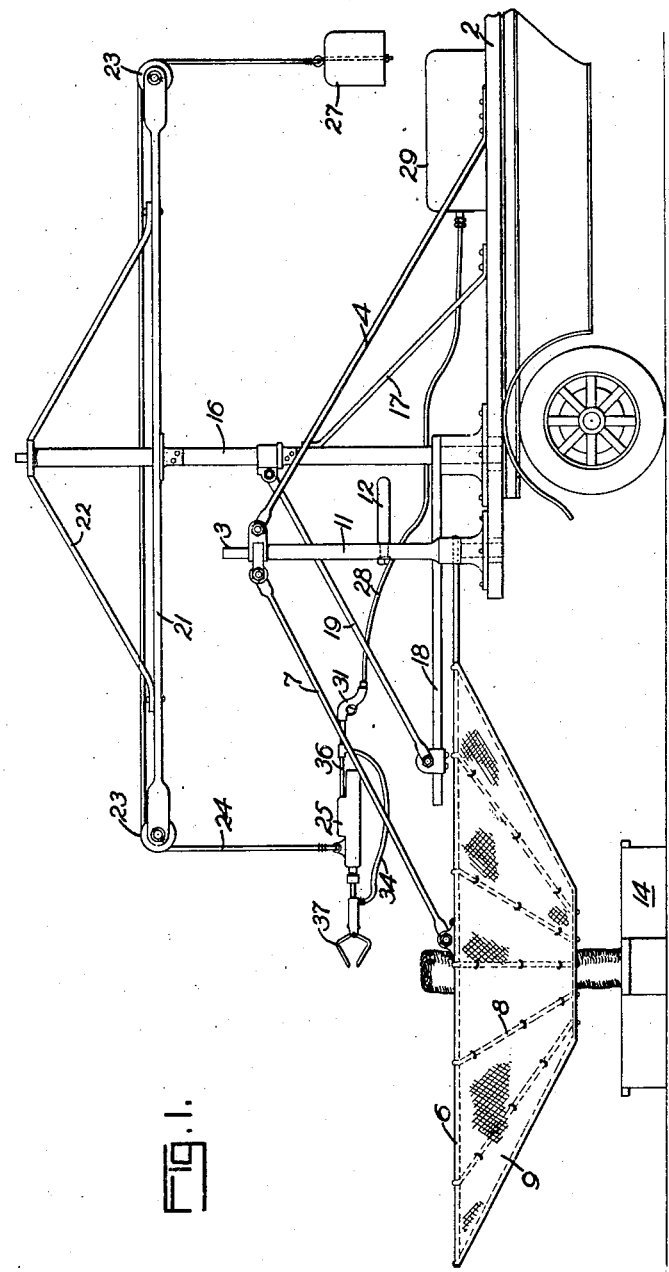

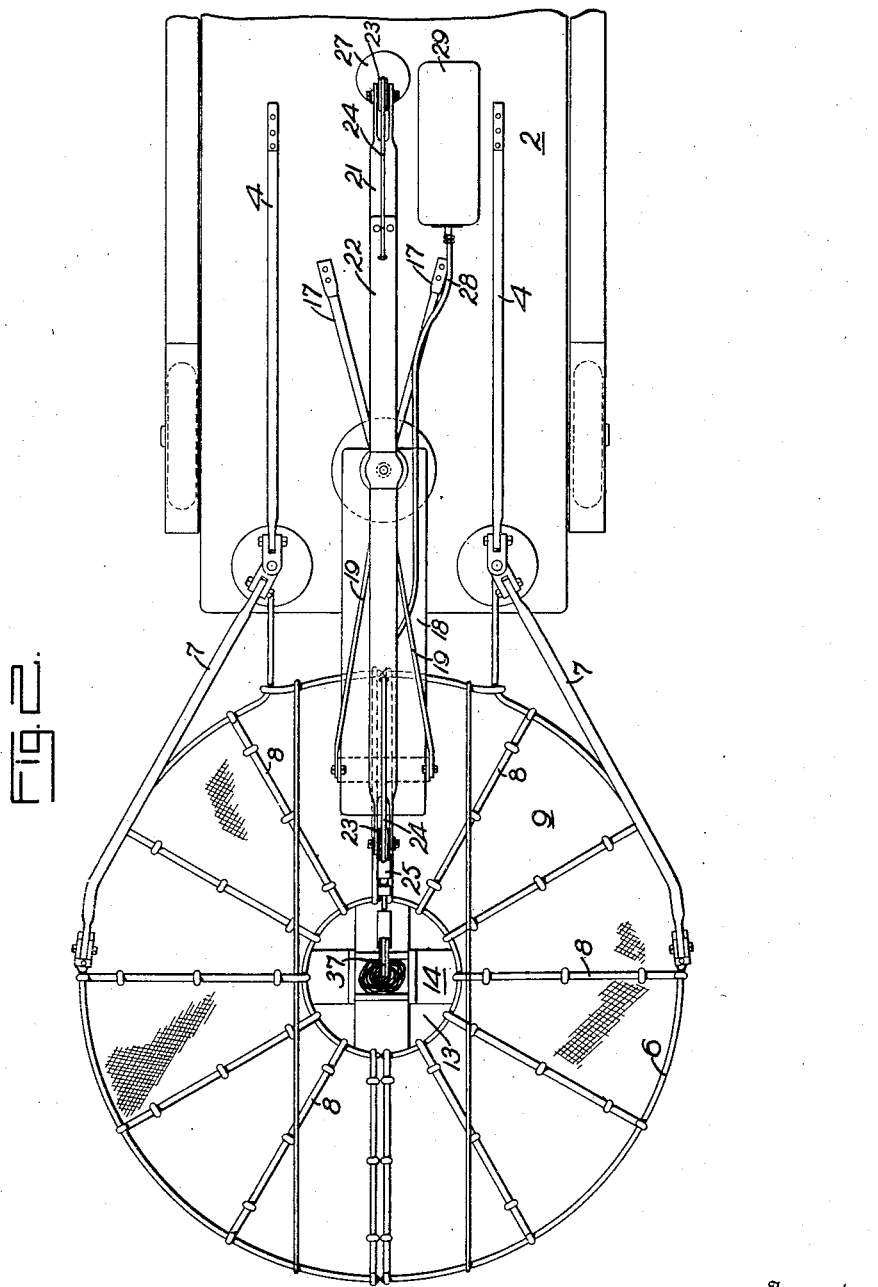

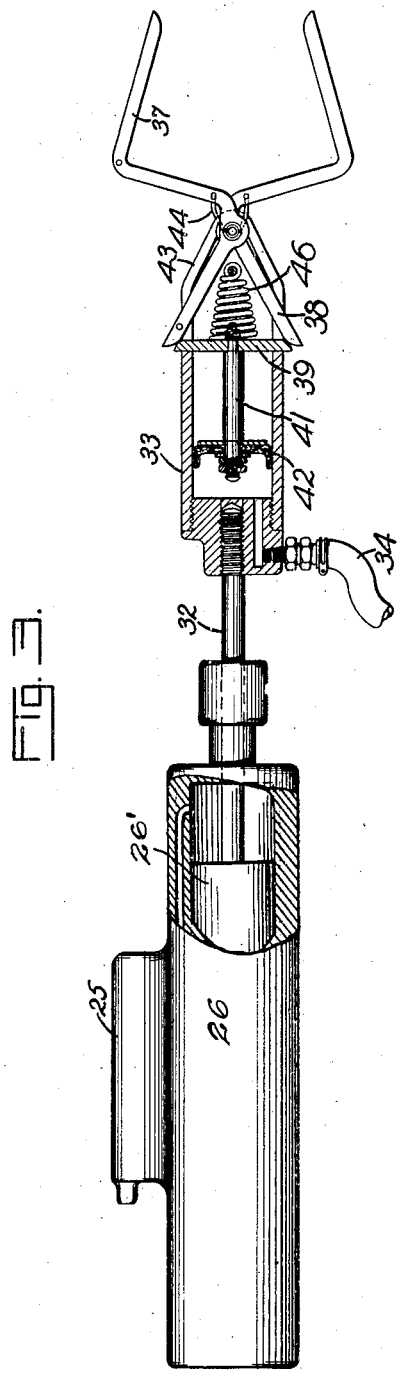

1,626,068

UNITED STATES PATENT OFFICE.

HAROLD W. BARTLETT, OF ALVARADO, CALIFORNIA.

APPARATUS FOR HARVESTING FRUIT.

Application filed November 19, 1923. Serial No. 675,487.

My invention relates to apparatus for shaking the fruit from a tree and catching the same, and one of the objects of the invention is the provision of means enabling the rapid gathering of fruit, particularly prunes.

Another object of the invention is the provision of an apparatus which may be worked rapidly thru an orchard from tree to tree and with which the fruit may be quickly shaken from the tree and caught without contamination by contact with the ground.

My invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a side elevation of the apparatus of my invention.

Figure 2 is a plan view of the apparatus.

Figure 3 is a side elevation partly in vertical section, showing the shaking means.

In terms of broad inclusion, my invention comprises a frame arranged on any suitable vehicle and on which a fabric receptacle formed in two halves is mounted, so that upon the approach of the vehicle to a tree, the two halves of the receptacle may be quickly positioned under the tree to form a complete receptacle for the falling fruit. The receptacle halves are pivotally supported on the vehicle frame and provided with suitable operating handles so that they may be readily swung into place about a tree, or separated after the operation is complete. The center of the receptacle is open so that fruit falling into the receptacle, gravitates toward the opening and is discharged into suitable boxes placed thereunder. Pendantly supported on a suitable boom arranged on the vehicle frame is a shaking device comprising a clamp, quickly securable to the tree and provided with means for reciprocating the clamp. The weight of the shaking device which is carried on a cable, is counterbalanced so that the operator may readily lower or raise it in accordance with the necessities of the case. A suitable trigger operated valve admits fluid under pressure simultaneously to a clamp operating means and to the reciprocating means so that the clamp is held tightly around the tree while the shaking device is reciprocating, and is released when the shaking device is stopped.

In detail, my invention comprises a frame 2 disposed on any suitable vehicle, and provided with a pair of posts 3, suitably braced by the tie rods 4. Pivotally mounted on each post is a horizontally extending, semi-circular arm 6 also suitably braced to the post by the tie rod 7. Rods 8 connected to the arm 6 complete a frame of the general shape of one-half of a truncated cone, and this frame is covered by a suitable fabric, such as canvas 9. The inner ends of the stay rod 7 and the arm 6 are connected by a tube 11 fitting over the post 3 and the tube is provided with a handle 12 with which the canvas covered frame may be swung laterally. The arrangement of the frames is such that they may be swung apart as the vehicle is backed into position adjacent the tree and then swung together, as shown in Figure 2, to enclose the tree. There is thus left an aperture 13 at the bottom of the receptacle thru which the fruit discharges into boxes 14 set around the base of the tree.

Also fixed on the frame 2 is a mast 16 suitably braced to the frame by the rods 17, and upon which a platform 18 for the operator is pivotally mounted. The platform is further supported from the mast by the tie rods 19.

Pivoted on the mast is the horizontal boom 21, suitably trussed by the member 22 and carrying at each end a pulley 23, over which the cable 24 runs. On one end of the cable, a fluid pressure operated shaking device generally designated in Figure 1 by the character 25, is pendantly supported at approximately its center of gravity, and on the other end of the cable, a counterbalancing weight 27 is secured. The operator is thus enabled to raise or lower the shaking device at will and apply it in any direction desired.

The shaking device comprises a cylinder 26 enclosing any desired type of fluid pressure operated mechanism including a piston 26' for reciprocating the rod 32. The cylinder is connected by a flexible conduit 28 to a source of fluid under pressure, such as the receiver 29, and is controlled by the usual trigger in the pistol grip 31. As shown in Figure 3, the rod 32 which is reciprocated by the mechanism of the reciprocating means, is provided with a cylinder 33, connected by the flexible conduit 34 with the supply pipe 36 of the reciprocating means, so that whenever fluid under pressure is admitted to the reciprocating means to operate the same, it is also admitted to the cylinder 33. Pivoted in the end of the cylinder, as shown in Figure 3, are a pair of bent, scissor-like arms 37 which form clamp jaws adapted to enclose the trunk or limbs of the tree. The inner ends 38 of the jaws are arranged to engage a cross-bar 39 mounted on the end of the rod 41 which at its other end carries the piston 42 which is disposed in the cylinder 33. Both the cross-bar 39 and the ends 38 of the clamp arms operate in slots 43 formed in the end of the cylinder. When the piston 42 is forced outwardly by the fluid under pressure admitted into the cylinder 33, the cross-bar 39 spreads the arms 38 and causes the jaws 37 to lock about the tree trunk or limb, as the case may be. A spring 44 interposed between the two clamp jaws at their pivotal point, tends to open the jaws upon the release of the pressure against them, and the recovery movement of the piston. I prefer to insure this recovery movement by the provision of a compression spring 46 interposed between the cylinder wall and the cross-bar 39.

Because of the weight of the parts, the inertia of the non-reciprocating members enables the operator to use the device without strain or discomfort.

When a tree is to be denuded of its fruit, the vehicle is backed into position and the receptacle halves brought together below the tree. The operator, standing upon the platform 18, then adjusts the shaking means to the proper height and presses the clamp jaws over the portion of the tree selected and opens the valve in the pistol grip 31, meanwhile steadying the device in position. With the flow of the pressure fluid to the operating mechanism, the piston 42 is also simultaneously moved outwardly to actuate the clamp and cause the jaws to lock tightly about the tree. The tree or limb is then agitated or vibrated as may be necessary to cause the fruit to loosen and fall. With the closing of the valve in the pistol grip, the vibration ceases and with the release of the pressure in the cylinder 33, the jaws are opened. With this apparatus I can take the prunes off a tree in from three to five minutes and not only is this saving of time a very material element, but the fruit is kept clean and in good condition.

I claim:

1. In an apparatus for harvesting fruit from a tree, means for shaking the tree, and adjustable means for supporting the weight of the shaking means.

2. In an apparatus for harvesting fruit from a tree, the combination of a vehicle, means mounted on said vehicle for shaking the tree, a receptacle mounted on said vehicle, and means for correlating said shaking means and said receptacle whereby said receptacle will intercept the fruit shaken from the tree.

3. In an apparatus for harvesting fruit from a tree, a clamp adapted to be secured to the tree, means pendantly supported for reciprocating the clamp, and means for counterbalancing the weight of the reciprocating means.

4. In an apparatus for harvesting fruit from a tree, a clamp adapted to be secured to the tree, means for reciprocating the clamp, a cable for supporting said reciprocating means, pulleys over which said cable runs, and a counterbalance on said cable.

5. An apparatus for harvesting fruit from a tree comprising a portable frame, a mast on said frame, a boom pivoted on said mast, pulleys on said boom, a cable running over said pulleys, a clamp adapted to be secured to the tree, means for reciprocating said clamp supported by said cable, and a counterbalance for the weight of said reciprocating means on said cable.

6. An apparatus for harvesting fruit from a tree comprising a portable frame, a boom pivotally supported on said frame, a clamp adapted to be secured to the tree, means pendantly supported on said boom for reciprocating said clamp, and means for counterbalancing the weight of said reciprocating means.

7. An apparatus for harvesting fruit from a tree comprising a portable frame, horizontal arms pivoted on said frame, a receptacle for the fruit arranged on said arms, one-half on each arm, and means for shaking the tree arranged on said frame.

8. An apparatus for harvesting fruit from a tree comprising a portable frame, horizontal arms pivoted on said frame, a receptacle for the fruit arranged on said arms, one-half on each arm to permit the tree to be surrounded and said receptacle being provided with a central discharge opening, and means for shaking the tree arranged on said frame.

9. An apparatus for shaking a tree comprising a rod, fluid pressure operated means for reciprocating said rod, a pair of jaws supported by said rod, and means for clamping said jaws upon the tree.

10. An apparatus for shaking a tree comprising a rod, fluid pressure operated means for reciprocating said rod, a pair of jaws supported by said rod, and fluid pressure controlled means for clamping and unclamping said jaws.

11. An apparatus for shaking a tree comprising a rod, fluid pressure operated means for reciprocating said rod, a pair of jaws, a cylinder, a piston in said cylinder operatively connected to said jaws, a conduit connecting said cylinder with said fluid pressure operating means so that pressure fluid flows to both simultaneously, and a spring for effecting the opening of said jaws.

12. An apparatus for shaking a tree comprising a rod, fluid pressure operated means for reciprocating said rod, a pair of jaws, and fluid pressure operated means for automatically locking said jaws together during the reciprocation of said rod.

In testimony whereof, I have hereunto set my hand.

HAROLD W. BARTLETT.